(No Model.) 2 Sheets—Sheet 1.
J. PECKOVER.
STONE SAWING MACHINE.
No. 500,034. Patented June 20, 1893.
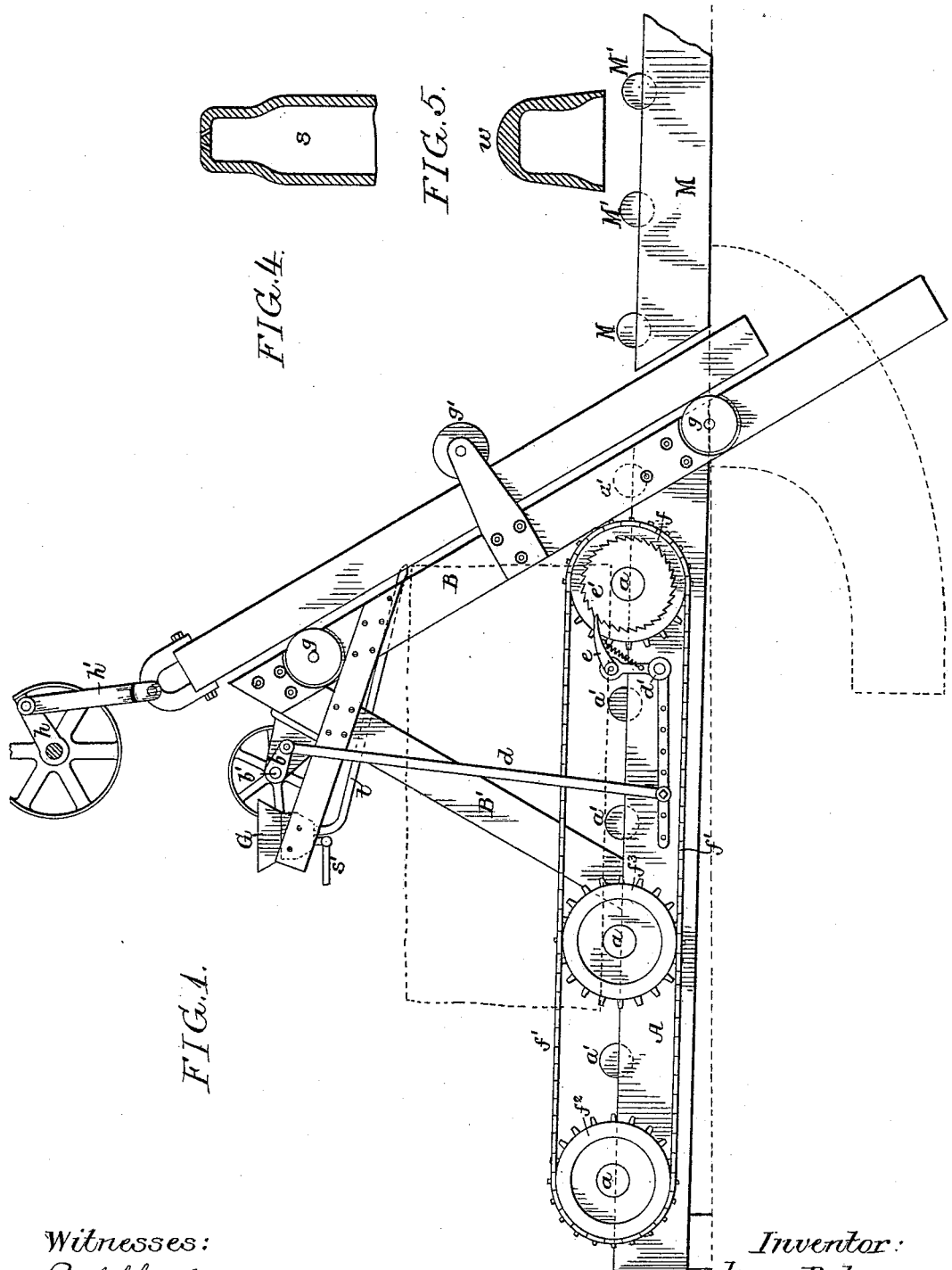
Witnesses:
R. Schleicher
F. O. Goodwin
Inventor:
James Peckover
by his Attorneys
Howson & Howson (No Model.) 2 Sheets—Sheet 2.
J. PECKOVER.
STONE SAWING MACHINE.
No. 500,034. Patented June 20, 1893.
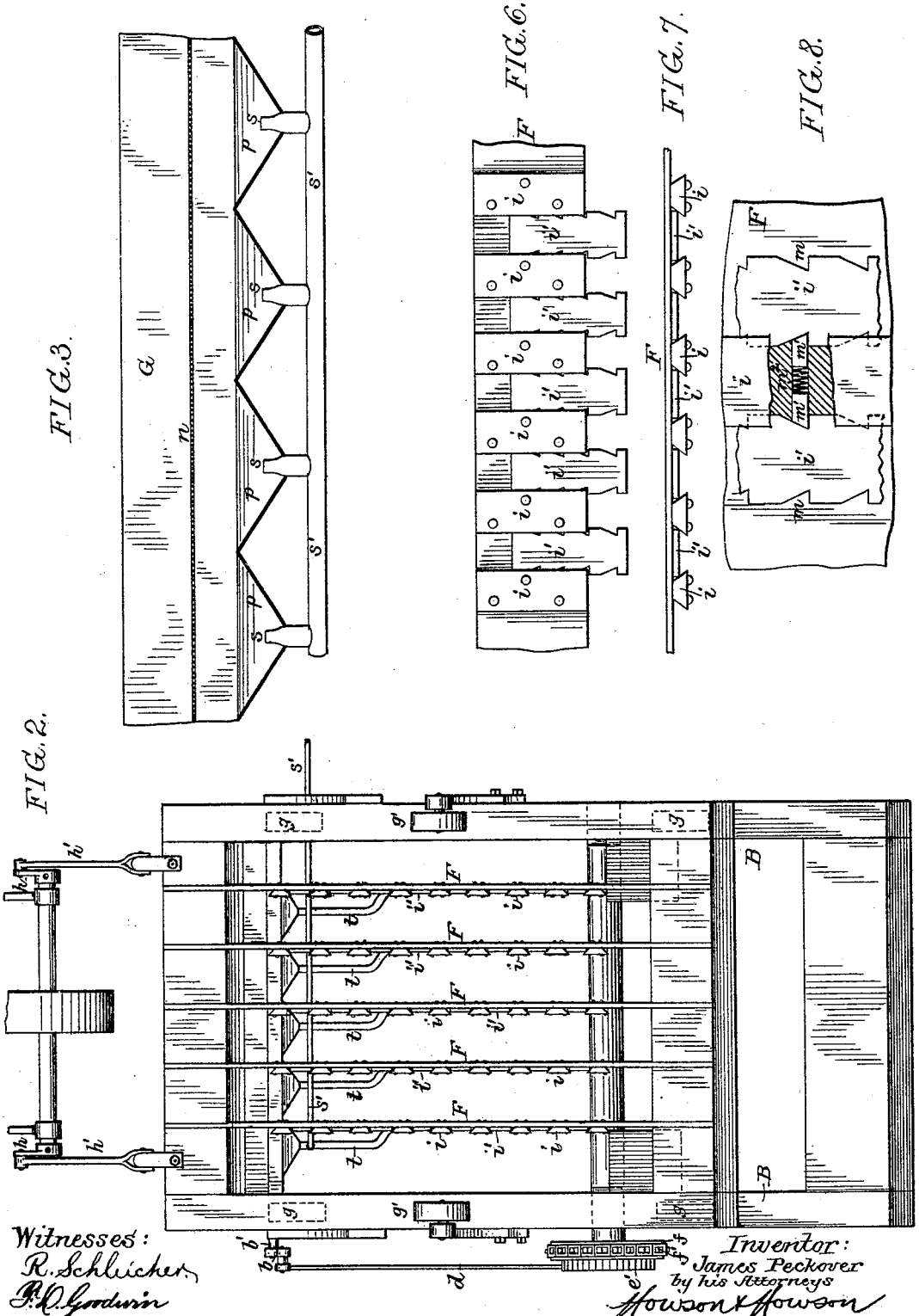

UNITED STATES PATENT OFFICE.

JAMES PECKOVER, OF HARRISBURG, PENNSYLVANIA.

STONE-SAWING MACHINE.

SPECIFICATION forming part of Letters Patent No. 500,034, dated June 20, 1893.

Application filed June 8, 1892. Serial No. 436,002. (No model.)

*To all whom it may concern:*

Be it known that I, JAMES PECKOVER, a subject of the Queen of Great Britain and Ireland, residing at Harrisburg, Dauphin county, Pennsylvania, have invented certain Improvements in Stone-Sawing Machines, of which the following is a specification.

The object of my invention is to so construct a stone sawing machine as to facilitate the feeding of the stone to the saw, to provide effective means for the delivery of the abrading material to the kerf in the stone, and to prevent the cutting away of the side walls of the kerf and consequent undue widening of the same by the blade of the saw. These objects I attain in the manner hereinafter set forth, reference being had to the accompanying drawings, in which—

Figure 1, is a side view of a stone sawing machine constructed in accordance with my invention. Fig. 2, is a front view of the same; and Figs. 3, 4, 5, 6, 7 and 8, are detached views illustrating details of construction, or special features of the machine.

A represents the base of the machine mounted so that it is somewhat higher at the rear than at the front end or in other words, inclined in respect to the horizontal so as to provide a slight forward pitch, and to suitable bearings in this base frame are adapted a series of rollers $a$ $a'$ upon which rests the block of stone to be cut, the angle of inclination of the base of the machine being such that gravity will aid in the forward movement of the block toward the saw, or the angle may be such that gravity will cause such forward movement, the rollers simply serving as supports. The rollers $a$, however, are, by preference, rotated in their bearings so as to aid in the forward movement of the stone. Intermittent movement is imparted to the foremost roller $a$ from a crank $b$ on a shaft $b'$, this crank being connected by a rod $d$ to a bell crank lever $d'$ hung to the base of the machine and carrying a pawl $e$ which acts upon a ratchet wheel $e'$ secured to said foremost roller $a$. To said roller is also secured a sprocket wheel $f$ and to the teeth of the latter is adapted a chain $f'$ which is adapted also to the teeth of other sprocket wheels $f^2, f^3$, secured respectively to the other rollers $a$ of the set, so that the block of stone which is being sawed always rests upon one or more of the rotating rollers.

Projecting upward and rearward from the front end of the base frame of the machine are the saw supporting beams B, the upper ends of which are suitably braced by means of struts B', these beams carrying rollers $g$ upon which rest the opposite side bars of the saw frame D, reciprocating motion being imparted to said frame from a rotating crank $h$ through the medium of a suitable connecting rod $h'$. Brackets on the side beams B carry other rollers $g'$ which bear upon the outer faces of the side bars of the saw frame and serve to prevent jumping of the same and thus maintain the saws at all times in the bottoms of the kerfs which are being formed in the stone.

The saw blades F are suitably secured to the top and bottom bars of the saw frame and each of said blades has riveted or otherwise secured to one face of the same dove tailed or undercut bars $i$ between which are confined the steel bits or teeth $i'$ of the saw, these bits or teeth projecting in advance of the front edge of the saw blade. In the opposite edges of each of the saw teeth are formed notches $m$ and in the bars $i$ are guided teeth or catches $m'$ which are acted upon by springs $m^2$ tending to project them, the engagement of these catches with the notches in the teeth serving to retain the latter in their proper position on the blade, while at the same time they permit the teeth to be moved forward to new positions as their projecting ends become worn.

As the effective thickness of the saw blade is that of the portions to which the bars $i$ are applied, it will be seen that the projecting teeth are thinner than the total thickness of the blade with its bars, so that the water and sand or other abrading material can be fed directly into the base of the kerf at the top of the stone, the abrading material being thus acted upon directly by the teeth of the saw, and no portion of said abrading material having of necessity to pass between the sides of the saw blade F and bars $i$ and the side walls of the kerf, as in cases where the saw works horizontally, hence in my improved sawing machine there is very little friction due to the movement of the saw in the kerf and the latter is not unduly widened by the action of abrading material between the side walls of the kerf and the thickened portions of the blade of the saw. The same principle of construction can also be embodied in circular saws for sawing stone, without departing from my invention.

In order to provide for the automatic feeding of the water and sand, or other abrading material to the stone as it is being sawed, I mount upon any convenient portion of the frame work of the machine a sand box or trough G in which the sand is supported upon a perforated plate or sieve $n$ beneath which are a series of pockets $p$ each containing a nozzle $s$ for the upward discharge of water derived from a supply pipe $s'$. These nozzles $s$ are constructed in substantially the same manner as a fish-tail gas burner, that is to say, with openings inclined toward each other so that the water issues from each nozzle in the form of a thin sheet or spray which is projected upward against the sieve $n$ and slowly washes down through said sieve the sand or other abrading material supported thereupon, the mixture of sand and water finding its way through suitable directing pipes or spouts $t$ to the various kerfs which are being formed in the stone. Each nozzle should be fitted with a stop cock for regulating or shutting off the flow of water, as may be desired.

Any desired number of nozzles may be used, there being by preference as many as there are blades in the saw frame, and there being also a corresponding number of feeding pipes or spouts $t$, but in the event of any or all of the nozzles being out of action they are provided with caps $w$ that can be placed over them to prevent their usefulness being impaired by dirt falling into the inclined openings through which the water must issue.

Beneath the saw frame is a pit, shown by dotted lines in Fig. 1, into which the sand, water, and detritus from the kerfs is permitted to run, the sand settling in the bottom of the pit and the water being permitted to escape through any suitable overflow passage.

In front of the machine is a frame M carrying rollers M' which receive and support the stone as the latter is fed forward beyond the saws.

I do not desire to claim the combination of the sand sieve, hopper, and conduits leading from the latter to the saws, as this is shown in my Patent No. 341,683, dated May 11, 1886, but

I claim and desire to secure by Letters Patent—

1. A stone sawing machine in which are combined a saw, a frame therefor, rigid upright guides for said frame, and a stone supporting bed or table inclined in respect to the horizontal, the stone resting directly upon said bed, and traveling by gravity over the same toward the saw, substantially as specified.

2. The combination in a stone sawing machine, of the reciprocating saw frame mounted so as to move in a plane inclined in respect to the vertical, with means for feeding the abrading material to the bottoms of the saw kerfs at the top of the stone, substantially as specified.

3. A stone cutting saw having a blade or body with undercut recesses therein, and cutting bits or teeth confined within said recesses and projecting beyond the front edge of the blade, said blade projecting laterally beyond the teeth, on both sides of the latter substantially as specified.

4. A stone cutting saw consisting of a blade or body with recesses therein, notched cutting bits or teeth adapted to said recesses, and bolts or catches for retaining the teeth in said recesses but permitting forward motion of the teeth to compensate for wear, substantially as specified.

5. The combination of the sand box having a sand supporting sieve, with water nozzles discharging upwardly into the sand-box and onto the bottom of said sieve, and conduits for conveying the sand and water from the sand box to the stone, substantially as specified.

6. The combination of the sand box having a sand supporting sieve, with water nozzles discharging upwardly into the sand-box and onto the bottom of said sieve, each of said nozzles having passages constructed to discharge water in the form of a fine sheet or spray, and conduits for conveying the sand and water from the sand box to the stone, substantially as specified.

In testimony whereof I have signed my name to this specification in the presence of two subscribing witnesses.

JAMES PECKOVER.

Witnesses:
   JNO. A. HERMAN,
   ROBERT A. SMITH.